United States Patent
Smith (10) Patent No.: US 11,842,637 B2
(45) Date of Patent: Dec. 12, 2023

(54) METHODS AND SYSTEMS FOR MANAGING TRAFFIC LIGHTS

(71) Applicant: DISH Wireless L.L.C., Englewood, CO (US)

(72) Inventor: Leo Smith, Wildwood, MO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 17/702,700

(22) Filed: Mar. 23, 2022

(65) Prior Publication Data

US 2023/0306842 A1  Sep. 28, 2023

(51) Int. Cl.
*G08G 1/087* (2006.01)
*G06Q 10/047* (2023.01)

(52) U.S. Cl.
CPC .................... *G08G 1/087* (2013.01)

(58) Field of Classification Search
None
See application file for complete search history.

(56) References Cited

U.S. PATENT DOCUMENTS

| 9,595,193 B1* | 3/2017 | Duale .................. G08G 1/0116 |
| 2019/0120654 A1* | 4/2019 | Todasco ............. G01C 21/3484 |

\* cited by examiner

*Primary Examiner* — John F Mortell
(74) *Attorney, Agent, or Firm* — Perkins Coie LLP (57) ABSTRACT

A technique is directed to methods and systems for managing multiple traffic light devices. In some implementations, the method includes (1) receiving a request for route planning for a vehicle; (2) determining a location of the vehicle; (3) planning a route for the vehicle at least based on the request and a set of rules; and (4) implementing the route for the vehicle by communicating with one or more of multiple traffic light devices along the route. In some implementations, the set of rules includes a subscription plan associated with the vehicle, and the subscription plan is indicative of an assigned priority of the vehicle.

20 Claims, 5 Drawing Sheets

METHODS AND SYSTEMS FOR MANAGING TRAFFIC LIGHTS

BACKGROUND

Traditional traffic lights are monitored and controlled by a government traffic control center. An operator observes traffic statuses at various intersections via multiple individual cameras located at the intersections. These traditional traffic lights can only be manually controlled by the operator (e.g., from the control center) or a police officer on the site. No other devices or vehicles can directly communicate with these traditional traffic lights. This conventional traffic control system is inflexible and inconvenient especially when there is a need for specific route setting (e.g., for an ambulance in response to an accident). Therefore, it is advantageous to have an improved system and method to address the foregoing needs.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for managing traffic lights so as to set a route for specific vehicles. For example, the present system includes multiple "smart" traffic light devices positioned in different locations (e.g., intersections, traffic junctions, etc.) in an area (e.g., an administrative district such as a city, a county, a school district, a campus, a national park, etc.).

Each of the smart traffic light devices can include a camera module, a traffic light module, and a communication module, as well as a controller to control the foregoing modules. The camera module is integrated with other modules and configured to capture images of the surroundings where the smart traffic light device is located. The captured images can be used to indicate a traffic status (e.g., whether a traffic lane is fully or partially occupied), vehicle identification, etc. In some embodiments, the camera module can be configured to identify images of objects (e.g., pedestrians, obstructions, etc.) in the intersection and such images and related information can be further used for route planning.

The traffic light module is configured to provide traffic information to a driver (or a passenger) of a vehicle or an autonomous driving system of the vehicle. In some embodiments, the traffic information can include green/red/yellow lights, moving directions, warning signals, textual indications (e.g., "STOP," "DANGER," "CHAIN REQUIRED," "PRIORITY LANE," "PASS-HOLDER ONLY" etc.), traffic signs, etc.

The communication module enables the traffic light device to communicate with other devices, such as a server, a vehicle, other traffic light devices, a portable device (e.g., a smartphone of a driver/passenger in a vehicle), etc. Via the communication module, each of the smart traffic light devices can communicate with one another, with one or more servers, as well as vehicles moving in the area. In some embodiments, the foregoing communications can be in a specific frequency band, such as a CBRS (Citizens Broadband Radio Service) band (e.g., 3550-3700 MHz), etc. In some embodiments, the foregoing communications can be made via multiple communication protocols such as WiFi, 5G, LTE, 3GPP, etc. In some embodiments, the communications can be performed via a dedicated communication channel.

One aspect of the present system (which includes multiple "smart" traffic light devices) is that it can provide individual route setting/planning/implementation for a vehicle. In some embodiments, for example, in response to a request for route planning (e.g., from a driver of the vehicle , a dispatcher, an autonomous driving system, etc.), the present system can (1) determine a location of the vehicle (e.g., via at least one of the traffic light devices); (2) plan/generate a route for the vehicle based on the request and a set of preset rules (e.g., a subscription of a "priority pass," a type of the vehicle [e.g., vehicles associated with police, infrastructure maintenance, first responders, etc.]); and (3) implement the planned route by one of more of the traffic light devices (e.g., controlled by a server or a set of predetermined instructions/software programs).

Another aspect of the present system is that it can optimize multiple routes for multiple types of vehicles and users. In some embodiments, the present system can plan multiple routes for various vehicles during a specific period of time (e.g., an hour, a day, etc.) within a specific area. For example, the present system can plan routes for 50 vehicles of commercial fleet X (e.g., a courier company) as well as 30 vehicles of taxi company Y in the same time. In the illustrated embodiments, assume that commercial fleet X has subscribed "High-Grade A" priority routing service and taxi company Y has subscribed "Normal-Grade B" priority routing service. When planning the routes, the vehicles of commercial fleet X have a higher priority over other vehicles (including those of taxi company Y), and the vehicles of taxi company Y have priority over other unsubscribed vehicles. For example, the system can satisfy commercial fleet X's routing needs first, then taxi company Y, and then other unsubscribed vehicles.

In some embodiments, different priorities can be implemented by assigning different time thresholds. For example, for unsubscribed users, a normal trip from point $P_1$ to point $P_2$ can be around 30 minutes For "Grade A" vehicles, the system can provide routes with at least 5-min faster (e.g., less than 25 minutes from point $P_1$ to point $P_2$). For "Grade B" vehicles, the system can provide routes with at least 3-min faster (e.g., less than 27 minutes from point $P_1$ to point $P_2$). When planning routes, the system can be set to first satisfy the time threshold requirements of vehicles with higher priorities. In some embodiments, the route planning includes setting the traffic lights for priority vehicles along their routes (e.g., all green light, less than 5 minutes wait time per 30 minutes, etc.). Once a route has been planned, the present system can implement the route by controlling the traffic light devices along the route. Embodiments of implementing a planned route are discussed in detail with reference to FIG. 2.

Yet another aspect of the present system is that it can collect traffic data for analysis and building traffic models for future uses. Multiple traffic light devices of the present system can continuously collect traffic data (e.g., by cameras), vehicle data (e.g., by communicating with vehicles), etc. and then transmit such data to a server for further analyses (e.g., route/traffic analyses, etc.). In some embodiments, these data can be used to train one or more machine learning models, and the trained models can be further used by the present system for route planning.

Figure 1:
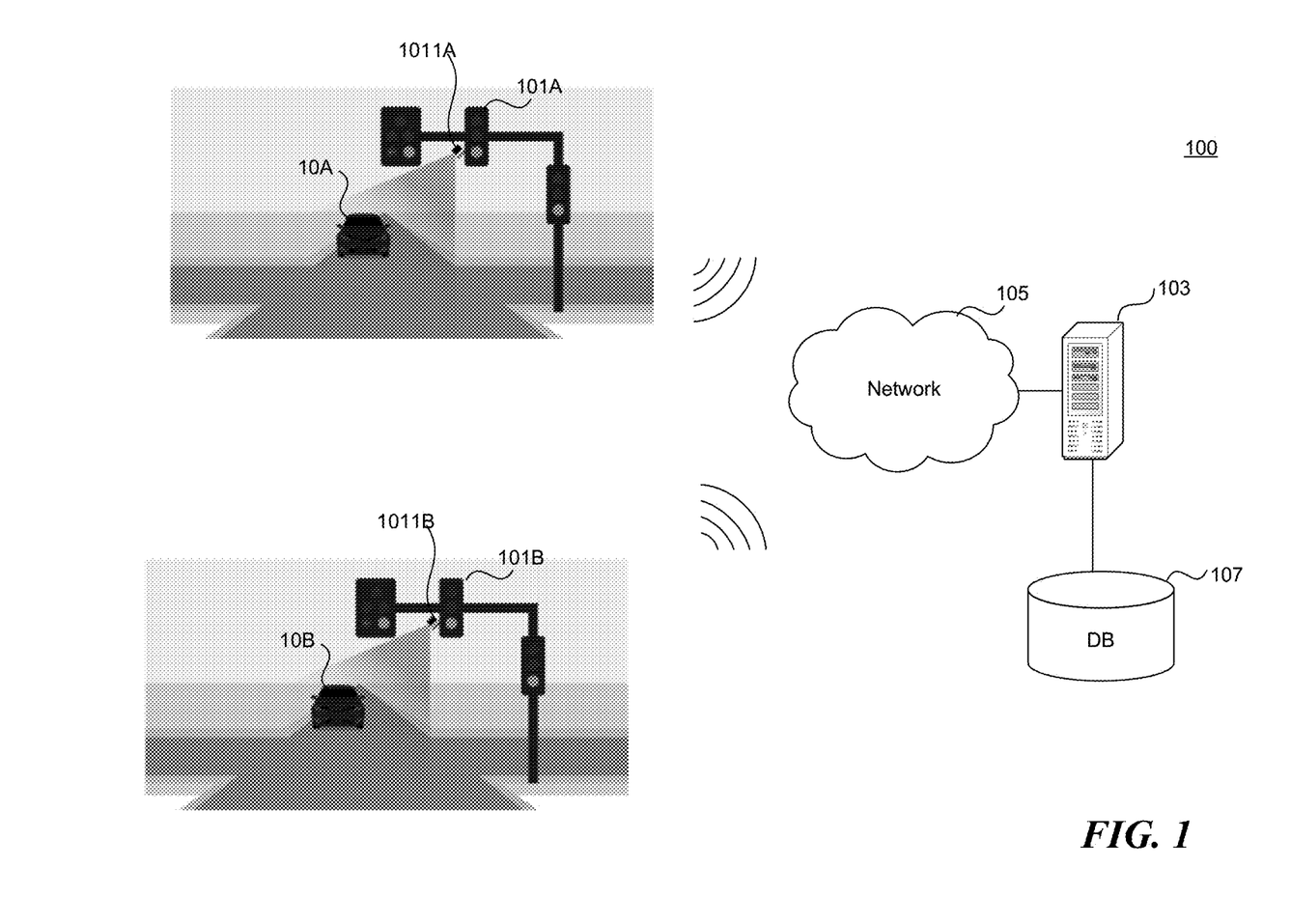
FIG. 1 is a schematic diagram illustrating a system for managing traffic light devices in accordance with some implementations of the present disclosure.

Several implementations are discussed below in more detail in reference to the figures. FIG. 1 is a schematic diagram illustrating a system 100 for managing multiple traffic light devices 101 (only 101A and 101B are shown). The traffic light devices 101 can communicate with vehicles 10 (only 10A and 10B are shown) via various types of communication protocols, such as WiFi, 5G, LTE, 3GPP, etc. The traffic light devices 101 include camera modules 1011 (only 1011A and 1011B are shown) configured to capture images and/or detect motions of the vehicles 10. The traffic light devices 101 can detect the existence and/or confirm the locations of the vehicles 10. The traffic light devices 101 can also collect traffic data such as lane occupancy, traffic volume, etc.

As shown in FIG. 1, the traffic light devices 101 can communicate with a server 103 via a network 105. The server 103 can further connect to a database 107. The database 107 is configured to store data collected from the traffic light devices 101, as well as data analyzed or trained by the server 103. Via the network 103, the traffic light devices 101 can transmit collected data to the server 103. The server 103 then analyzes and trains (e.g., by one or more machine learning or artificial intelligence schemes) the collected data so as to form a traffic model for route planning. In some embodiments, the traffic model can include an average travel time from a stating point to a destination within an area during a specific time (e.g., peak hour or off-peak hour).

After the traffic model is built, the server 103 can plan a route for one or more vehicles based on (1) the locations of the vehicles (e.g., determined and/or confirmed by the traffic light devices 101) and (2) the traffic model. In some embodiments, the server 103 can set a routing plan based on subscriptions (e.g., fast pass), statuses of vehicles (e.g., "on track to a planned destination," "in a rush," "late for a planned meeting," "running out of gas," "cruising without a particular destination," "looking for restaurants," etc.), types of vehicles (e.g., autonomous vehicle or human-driven, courier fleet, rental cars, police vehicles, ambulance, government vehicles, etc.), performances of vehicles (e.g., sports cars, low-speed cars, etc.), etc.

For example, a user of vehicle A has a valid "fast pass" subscription. The user can send a request to the server 103 for route planning. The server 103 then plans a route for vehicle A based on its current location and the traffic model. In some embodiments, the server 103 can determine that the planned route for vehicle A is 5-min faster than a normal vehicle without any subscription. When vehicle A starts to move following the planned route, the server 103 can instruct the traffic light devices 101 along the planned route to implement the "5-min faster" routing plan. For example, the server 103 can decrease possible wait time for vehicle A by adjusting the traffic light devices 101 along the planned route (e.g., more "green lights" and fewer "red lights").

In some embodiments, there can be multiple levels of subscription plans (e.g., "fast pass," "Premium fast pass," "Highest Priority fast pass," etc.), and the server 103 can consider the differences of these subscription plans and determine routes based on assigned priorities to these subscription plans.

Figure 2:
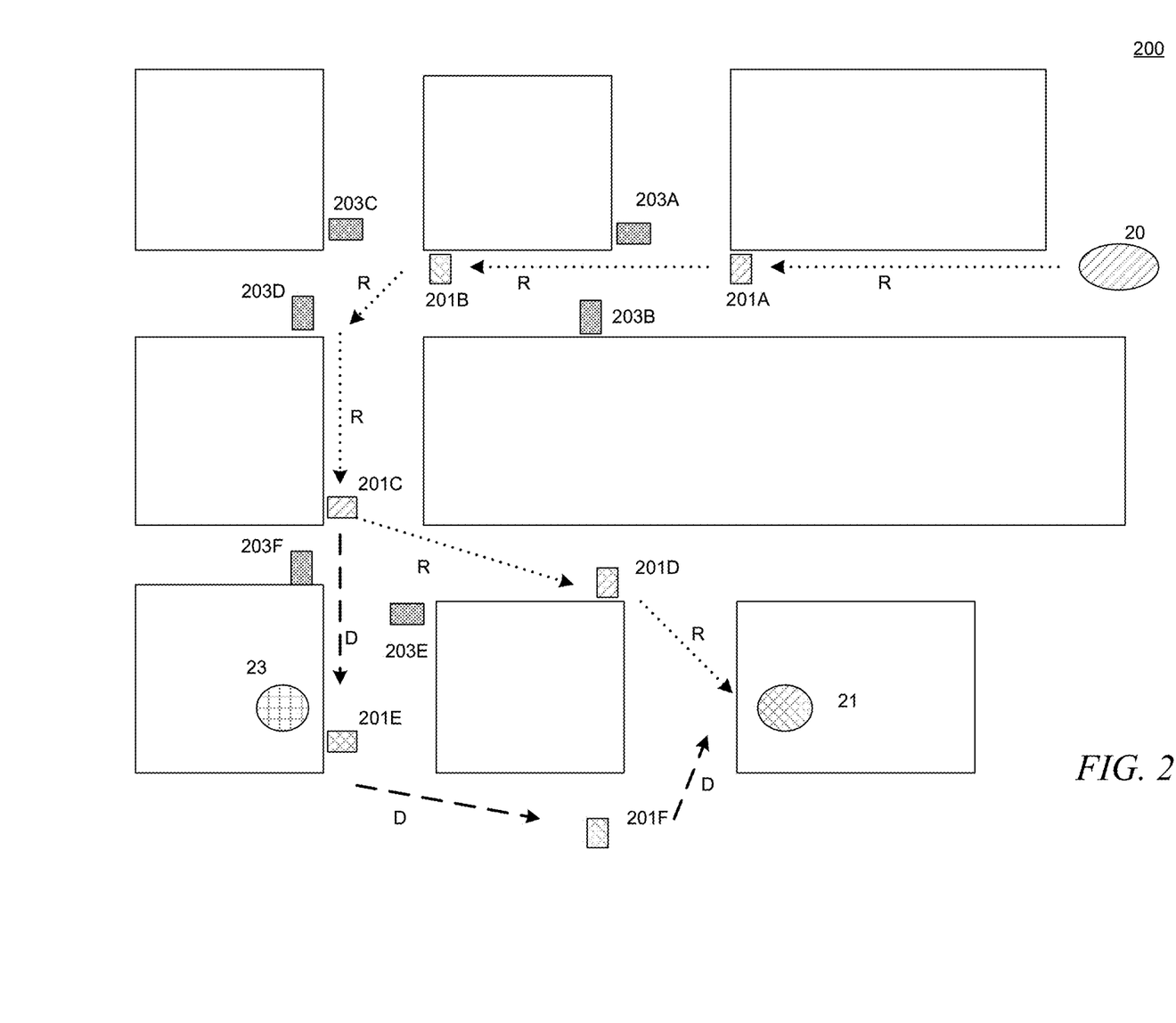
FIG. 2 is a schematic diagram illustrating route setting and implementation in accordance with some implementations of the present disclosure.

FIG. 2 is a schematic diagram illustrating route setting/implementation processes in accordance with implementations of the present disclosure. In an area 200, there are multiple traffic light devices (only 201A-F and 203A-F are shown as examples) controlled by a server (e.g., the server 103 of FIG. 1). A user of vehicle 20 (which has a "fast pass" subscription) can send a request to the server for route planning to a destination 21. The server then plans a route R for vehicle 20. As shown in FIG. 2, along route R, traffic light devices 201A-201D are "directly involved" (e.g., the server directly instruct these traffic light devices to act for vehicle 20), whereas traffic light devices 203A-F are "indirectly involved" (e.g., these traffic light devices act in response to the actions of the "directly-involved" traffic light devices).

When vehicle 20 moves along the planned route R, the server monitors the location of vehicle 20 and controls the (directly-involved) traffic light devices 201A-201D to give vehicle 20 more "green lights" based on its "fast pass" subscription. The server also controls the (indirectly-involved) traffic light devices 203A-F accordingly (e.g., more "red lights" in accordance with the changes of the directly-involved traffic light devices 201A-201D).

In some embodiments, the server can plan routes for multiple vehicles during the same period. When planning multiple routes, the server considers priorities assigned to various vehicles and optimizes the multiple routes (e.g., based on the traffic model discussed above). Factors affecting the assigned priorities include, for example, subscriptions, statuses/types/performance of vehicles, etc. For example, vehicle $V_1$ (with assigned priority $P_1$) and vehicle $V_2$ (with assigned priority $P_2$ lower than $P_1$) both need to pass interaction X at time $T_1$. Since vehicle $V_1$ has a higher assigned priority, the server will plan the route for vehicle $V_1$ first (e.g., let vehicle $V_1$ pass interaction X at time $T_1$), and then plan the route for vehicle $V_2$ (e.g., perhaps let vehicle $V_2$ pass interaction X at time $T_2$, which can be later or earlier than time $T_1$). By this configuration, the server can plan multiple routes for multiple vehicles effectively and efficiently.

In some embodiments, the server can consider adding a point-of-interests (POI) in planned routes. The POI can include for example, a store with promotion, a restaurant, etc. In some embodiments, an owner or a manager of a POI can subscribe advertisement services and then the server can promote the POI accordingly. In some embodiments, route planning involving POIs can be time specific (e.g., lunch hour, seasonal sales, etc.).

For example, a store 23 has subscribed an advertisement service. Accordingly, the server can direct more vehicles to store 23 when planning routes. As shown in FIG. 2, vehicle 20 can be directed to deviate from route R (not passing store 23) to route D (which passes store 23). More particularly, the server controls the traffic light devices 201E, 201F to implement route D, instead of the traffic light 201D to implement route R. In some embodiments, a user of vehicle 20 can opt out the foregoing deviation by subscripting a "no-ads" plan.

In some embodiments, when the server detects that vehicle 20 is near the store 23, the server can instruct traffic light device 201E to transmit or push some information to vehicle 20 (e.g., "lunch special," "buy one get one free," etc.).

In some embodiments, the server can also offer some intersection-specific route planning. For example, during off-peak hours (e.g., early morning and later at night), if the server detects that a vehicle is waiting at intersection Y (e.g., the traffic light device detects the vehicle and reports to the server) and there is no other traffic there, the server can adjust the traffic light device at intersection Y to let the vehicle pass immediately. By this arrangement, there will be fewer vehicles sitting at intersections for no reason. Accordingly, the server can improve overall traffic and effectively decrease unnecessary wait time.

In some embodiments, the server can provide updated traffic information to subscribers. For example, the server can provide trained historical data regarding how busy intersections are at different times of a day and also send real time data to the subscribers. The foregoing information can be beneficial for rerouting and planning optimal routes.

Figure 3:
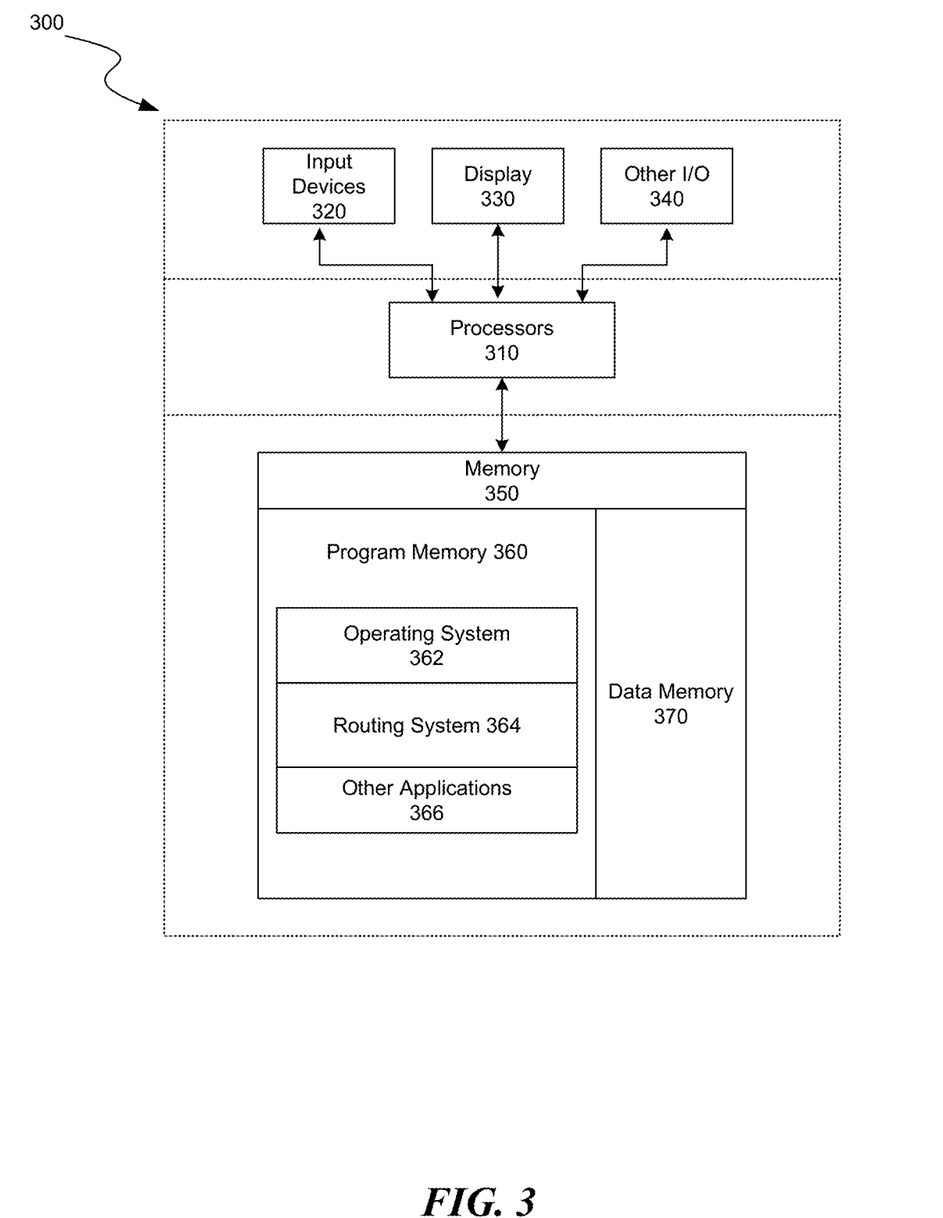
FIG. 3 is a block diagram illustrating an overview of devices on which some implementations can operate.

FIG. 3 is a block diagram illustrating an overview of devices (e.g., the server 103) on which some implementations can operate. The devices can comprise hardware components of a device 300 that controls and communicates with multiple traffic light devices. Device 300 can include one or more input devices 320 that provide input to the processor(s) 310 (e.g. CPU(s), GPU(s), etc.), notifying it of actions. The actions can be mediated by a hardware controller that interprets the signals received from the input device and communicates the information to the processors 310 using a communication protocol. Input devices 320 include, for example, a mouse, a keyboard, a touchscreen, an infrared sensor, a touchpad, a wearable input device, a camera- or image-based input device, a microphone, or other user input devices.

Processors 310 can be a single processing unit or multiple processing units in a device or distributed across multiple devices. Processors 310 can be coupled to other hardware devices, for example, with the use of a bus, such as a PCI bus or SCSI bus. The processors 310 can communicate with a hardware controller for devices, such as for a display 330. Display 330 can be used to display text and graphics. In some implementations, display 330 provides graphical and textual visual feedback to a user. In some implementations, display 330 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 340 can also be coupled to the processor, such as a network card, video card, audio card, USB, firewire or other external device, camera, printer, speakers, CD-ROM drive, DVD drive, disk drive, or Blu-Ray device.

In some implementations, the device 300 also includes a communication device capable of communicating wirelessly or wire-based with a network node. The communication device can communicate with another device or a server through a network using, for example, TCP/IP protocols. Device 300 can utilize the communication device to distribute operations across multiple network devices.

The processors 310 can have access to a memory 350 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 350 can include program memory 360 that stores programs and software, such as an operating system 362, routing system 364 (e.g., for implementing the routing plan discussed herein), and other application programs 366. Memory 350 can also include data memory 370, user interface data, event data, image data, biometric data, sensor data, device data, location data, network learning data, application data, alert data, structure data, camera data, retrieval data, management data, notification data, configuration data, settings, user options or preferences, etc., which can be provided to the program memory 360 or any element of the device 300.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4:
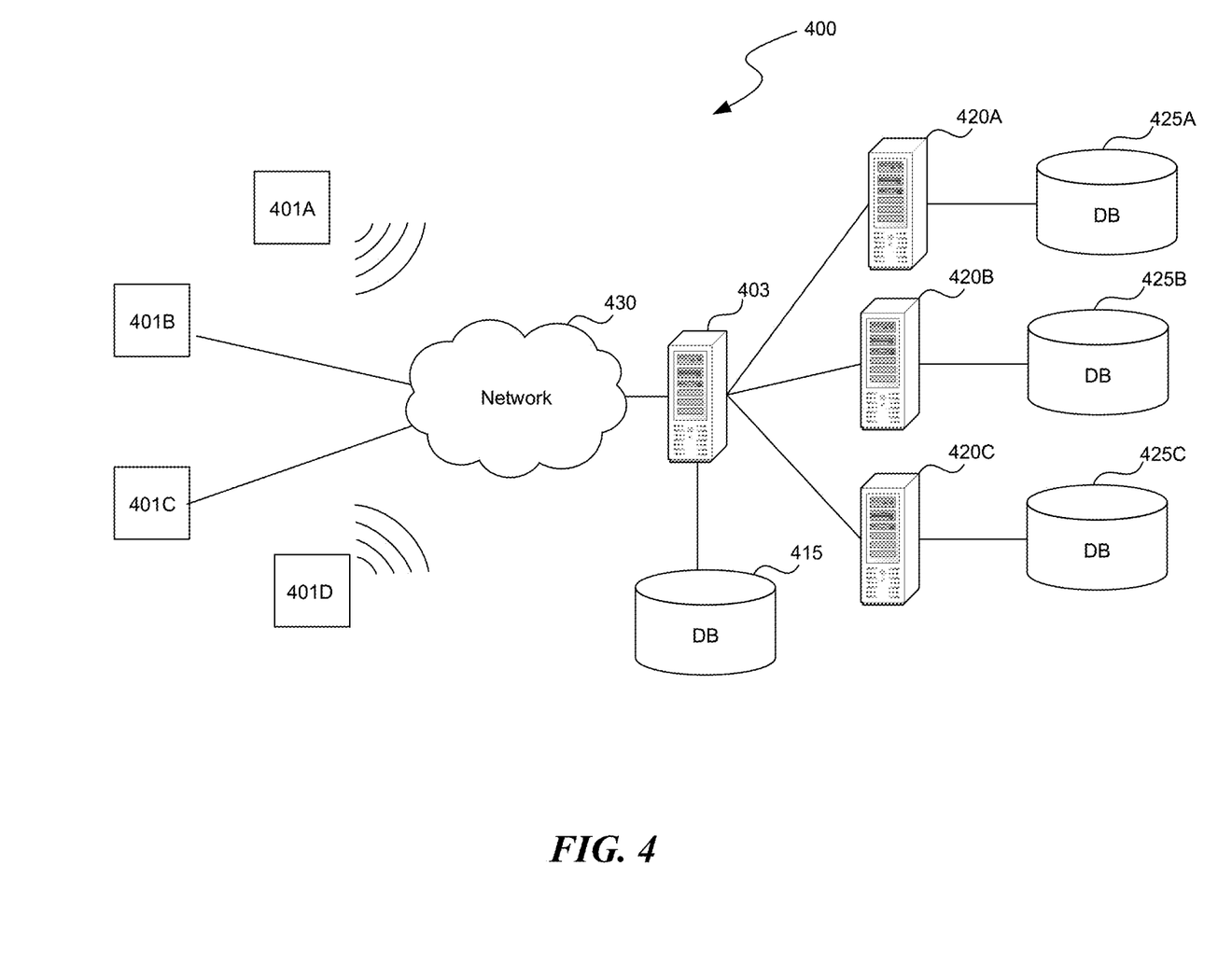
FIG. 4 is a block diagram illustrating an overview of an environment in which some implementations can operate.

In some embodiments, the traffic light devices discussed herein can also include components discussed in FIG. 3, such as the input device 320 (e.g., an image camera, a motion sensor, etc.), the processor 310, and the memory 350. In addition, the traffic light devices can also include a traffic light module (e.g., including green/red/yellow lights and other indicative lights). In some embodiments, the FIG. 4 is a block diagram illustrating an overview of an environment 400 in which some implementations can operate. Environment 400 can include one or more client computing devices 401A-D, examples of which can include the traffic light devices 101, 201, and 203. Client computing devices 401 can operate in a networked environment using logical connections through network 430 to one or more remote computers, such as a server computing device 403.

In some implementations, the server computing device 403 can be an edge server which receives client requests and coordinates fulfillment of those requests through other servers, such as servers 420A-C. Server computing devices 403 and 420 can comprise computing systems, such as the device 300 discussed above. Though each server computing device 403 and 420 is displayed logically as a single server, server computing devices can each be a distributed computing environment encompassing multiple computing devices located at the same or at geographically disparate physical locations. In some implementations, each server 420 corresponds to a group of servers.

The client computing devices 401 and the server computing devices 403 and 420 can each act as a server or client to other server/client devices. Server 403 can connect to a database 415. Servers 420A-C can each connect to a corresponding database 425A-C. As discussed above, each server 420 can correspond to a group of servers, and each of these servers can share a database or can have their own databases.

Databases 415/425 can store information such as implement data, user interface data, event data, image data, detection data, biometric data, sensor data, device data, location data, network learning data, application data, alert data, structure data, camera data, retrieval data, management data, notification data, configuration data. Though databases 415/425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. Network 430 may be the Internet or some other public or private network. Client computing devices 401 can be connected to network 430 through a network interface, such as by wired or wireless communication. While the connections between server 403 and servers 420 are shown as separate connections, these connections can be any kind of local, wide area, wired, or wireless network, including network 430 or a separate public or private network.

In some embodiments, data can be stored on edge compute servers (e.g., server 403) for low latency on inter traffic light communications, self-driving car communication, and/or accident alerting.

Figure 5:
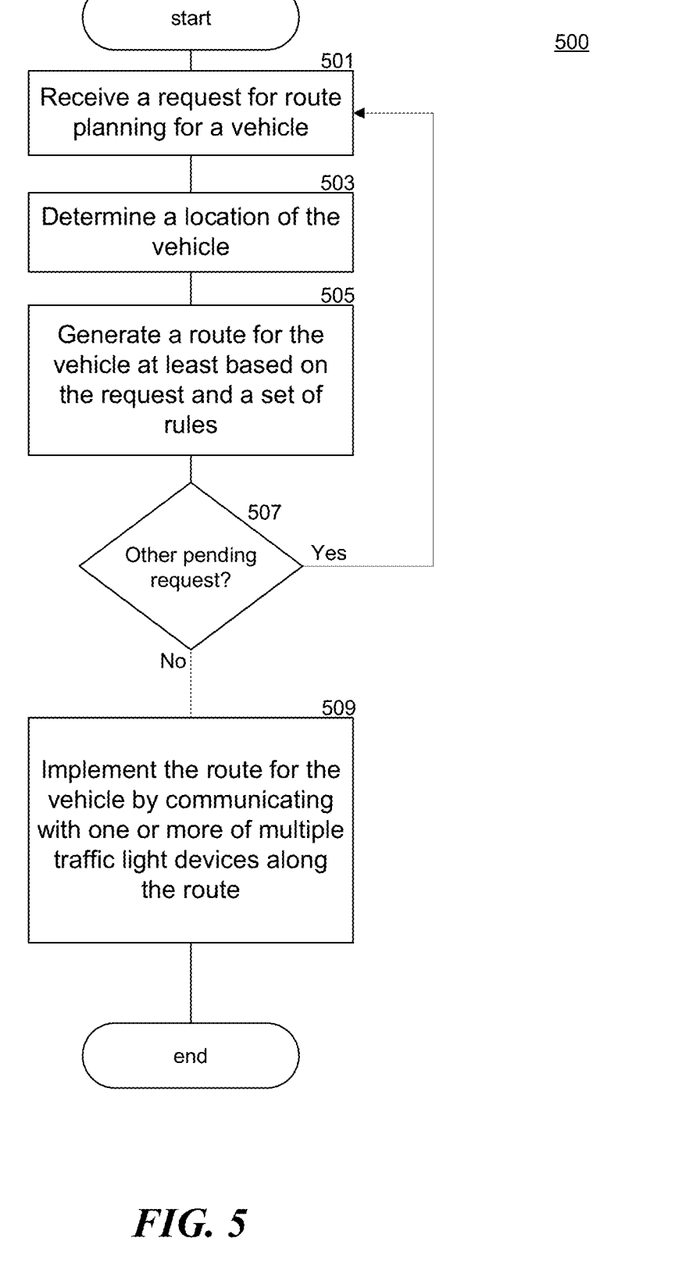
FIG. 5 is a flow diagram illustrating a process used in some implementations for outputting alerts on user interfaces.

FIG. 5 is a flow diagram illustrating a method 500 used in some implementations for managing multiple traffic light devices and route planning for vehicles. In some embodiments, the method 500 can be implemented by a server (e.g., the server 103 or 403) discussed herein.

At step 501, the method 500 receives a request for route planning for a vehicle. In some embodiments, the request can be generated by a user of the vehicle (e.g., via a computing system embedded in the vehicle or via a mobile device carried by the user). In some embodiments, the request can be generated by an autonomous driving system of the vehicle. In some implementations, the requested can be transmitted to the server from the vehicle, a user device, or one or more of the multiple traffic light devices.

At step 503, the method 500 determines a location of the vehicle. In some implementations, the location of the vehicle can be determined by the server communicating with at least one of the multiple traffic light devices (so as to confirm or verify the location of the vehicle). In some embodiments, the location of the vehicle can be received from other sources such as via a location service (e.g., GPS, positioning by wireless beacons, etc.)

At step 505, the method 500 generates a route for the vehicle at least based on the request and a set of rules. In some embodiments, the set of rules includes a subscription plan associated with the vehicle. In some examples, the subscription plan is indicative of an assigned priority of the vehicle (e.g., with a high or low priority depending on the subscribed plan). In some embodiments, the set of rules can include a characteristic of the vehicle, such as a status, a type, and/or a performance of the vehicle.

In some embodiments, the multiple traffic light devices can communicate with the server in a specific frequency band, such as a CBRS (Citizens Broadband Radio Service) band. In some implementations, the multiple traffic light devices can communicate via protocols such as WiFi, 5G, LTE, 3GPP, etc.

In some embodiments, the route is generated based on the assigned priority of the vehicle. If the assigned priority is high, the generated route can be faster than others with low priorities. Embodiments of generating a route are discussed above with refence to FIG. 1.

At step 507, the method 500 determines if there is another routing request to complete. If affirmative, the process goes back to step 501. If negative, the process continues to step 509. At step 509, the method 500 implements the generated route for the vehicle by communicating with one or more of multiple traffic light devices along the route. For example, with a high assigned priority, the method instructs the one or more of multiple traffic light devices along the route to grant access (e.g., maintain or change to green light) to the vehicle when the vehicle approaches. In some embodiments, when there are multiple generated routes and vehicles, the one with higher assigned priorities will be implemented first.

In some embodiments, the method 500 incudes deviating the vehicle to a point of interests (POI) based on an advertisement plan. Embodiments of deviating a route are discussed above with refence to FIG. 2.

Those skilled in the art will appreciate that the components illustrated in FIGS. 1-5 described above, and in each of the flow diagrams discussed below, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method, comprising:
    receiving, at a server, a request for route planning for a vehicle;
    determining, at the server, a location of the vehicle;
    generating, at the server, a route for the vehicle at least based on the request and a set of rules, wherein the set of rules includes a subscription plan associated with the vehicle, and wherein the subscription plan is indicative of an assigned priority of the vehicle; and
    implementing, at the server, the route for the vehicle by communicating with one or more of multiple traffic light devices along the route.

2. The method of claim 1, further comprising:
    determining, at the server, the location of the vehicle by communicating with at least one of the multiple traffic light devices.

3. The method of claim 1, wherein the set of rules includes a characteristic of the vehicle.

4. The method of claim 3, wherein the characteristic of the vehicle includes a status, a type, or a performance of the vehicle.

5. The method of claim 1, wherein the multiple traffic light devices along the route are configured to communicate with the server in a specific frequency band.

6. The method of claim 1, wherein the specific frequency band is a CBRS (Citizens Broadband Radio Service) band.

7. The method of claim 1, wherein each of the multiple traffic light devices includes a controller, a traffic light module, and a camera module.

8. The method of claim 1, wherein implementing, at the server, the route for the vehicle comprises:
    instructing the one or more of multiple traffic light devices along the route to grant access to the vehicle upon detecting the vehicle approaches the one or more of multiple traffic light devices.

9. The method of claim 1, wherein planning, at the server, the route for the vehicle at least based on the request and a set of rules comprises:
    deviating the vehicle to a point of interests (POI) based on an advertisement plan.

10. A computing system comprising:
    at least one processor; and
    at least one memory storing instructions that, when executed by the processor, cause the computing system to perform a process comprising:
    receiving a request for route planning for a vehicle;
    generating a route for the vehicle at least based on the request and a set of rules, wherein the set of rules includes a subscription plan associated with the vehicle, and wherein the subscription plan is indicative of an assigned priority of the vehicle; and
    implementing, at the server, the route for the vehicle by communicating with one or more of multiple traffic light devices along the route.

11. The computing system of claim 10, wherein the process further comprises:
    determining a location of the vehicle by communicating with at least one of the multiple traffic light devices.

12. The computing system of claim 10, wherein the set of rules includes a characteristic of the vehicle.

13. The computing system of claim 12, wherein the characteristic of the vehicle includes a status, a type, or a performance of the vehicle.

14. The computing system of claim 10, wherein the multiple traffic light devices along the route are configured to communicate with the computing system in a CBRS (Citizens Broadband Radio Service) band.

15. The computing system of claim 10, wherein the process further comprises:
    instructing the one or more of multiple traffic light devices along the route to grant access to the vehicle upon detecting the vehicle approaches the one or more of multiple traffic light devices.

16. The computing system of claim 10, wherein the process further comprises:
    deviating the vehicle to a point of interests (POI) based on an advertisement plan.

17. A non-transitory computer-readable medium storing instructions that, when executed by a computing system, cause the computing system to perform operations comprising:
    receiving a request for route planning for a vehicle;

generating a route for the vehicle at least based on the request and a set of rules, wherein the set of rules includes a subscription plan associated with the vehicle, and wherein the subscription plan is indicative of an assigned priority of the vehicle; and implementing the route for the vehicle by communicating with one or more of multiple traffic light devices along the route.

18. The non-transitory computer-readable medium of claim 17, wherein the operations further comprise:
determining a location of the vehicle by communicating with at least one of the multiple traffic light devices.

19. The non-transitory computer-readable medium of claim 17, wherein the operations further comprise:
instructing the one or more of multiple traffic light devices along the route to grant access to the vehicle upon detecting the vehicle approaches the one or more of multiple traffic light devices.

20. The non-transitory computer-readable medium of claim 17, wherein the operations further comprise:
deviating the vehicle to a point of interests (POI) based on an advertisement plan.

\* \* \* \* \*